(12) United States Patent
Murase

(10) Patent No.: US 12,468,582 B2
(45) Date of Patent: Nov. 11, 2025

(54) CONTROL DEVICE, CONTROL METHOD, AND PROGRAM

(71) Applicant: Mitsubishi Electric Corporation, Tokyo (JP)

(72) Inventor: Toru Murase, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/875,728

(22) PCT Filed: Aug. 17, 2022

(86) PCT No.: PCT/JP2022/031083
§ 371 (c)(1),
(2) Date: Dec. 17, 2024

(87) PCT Pub. No.: WO2024/038519
PCT Pub. Date: Feb. 22, 2024

(65) Prior Publication Data
US 2025/0173200 A1    May 29, 2025

(51) Int. Cl.
*G06F 9/54* (2006.01)
*G06F 13/20* (2006.01)

(52) U.S. Cl.
CPC .............. *G06F 9/542* (2013.01); *G06F 13/20* (2013.01); *G06F 2213/40* (2013.01)

(58) Field of Classification Search
CPC ..... G06F 9/542; G06F 16/1734; H04L 41/06; H04L 41/0604
See application file for complete search history.

(56) References Cited

U.S. PATENT DOCUMENTS 11,748,326 B2 * 9/2023 Hisano .................... H04W 4/70
                                                          707/746
12,063,609 B2 * 8/2024 Kwon ............... H04W 56/0035
                       (Continued)

FOREIGN PATENT DOCUMENTS

| JP | H02-035533 A | 2/1990 |
|----|--------------|--------|
| JP | 2012-194680 A | 10/2012 |
| JP | 2015-176387 A | 10/2015 |

OTHER PUBLICATIONS

International Search Report and Written Opinion mailed on Nov. 8, 2022, received for PCT Application PCT/JP2022/031083, filed on Aug. 17, 2022, 8 pages including English Translation.
(Continued)

*Primary Examiner* — Andy Ho
(74) *Attorney, Agent, or Firm* — XSENSUS LLP

(57) ABSTRACT

A control device includes an input interface to receive input information from an input device, an output interface to output output information to an output device, a sampler that generates a request identifier uniquely identifying the input information and sampling data in which the input information and the request identifier are associated with each other and stores the sampling data into a storage, and a controller that processes the input information associated with the request identifier as a request, generates process state information about a process, and causes the output interface to output a result of the process as the output information. The sampler further associates at least one of the process state information or the output information with the sampling data and stores the sampling data into the storage.

14 Claims, 15 Drawing Sheets

(56) References Cited

U.S. PATENT DOCUMENTS

| | | |
|---|---|---|
| 2014/0058538 A1 | 2/2014 | Yaoita et al. |
| 2020/0153504 A1* | 5/2020 | Tanimura ............... H04B 10/61 |
| 2022/0329611 A1* | 10/2022 | Ushio ................. H04L 63/1441 |
| 2023/0261474 A1* | 8/2023 | Thorsen ................. H02J 3/381 |
| | | 700/286 |

OTHER PUBLICATIONS

Decision to Grant mailed on Apr. 18, 2023, received for JP Application 2023-511769, 5 pages including English Translation.

* cited by examiner

CONTROL DEVICE, CONTROL METHOD, AND PROGRAM

CROSS-REFERENCE TO RELATED APPLICATION

This application is a national stage application, pursuant to 35 U.S.C. § 371, of International Patent Application No. PCT/JP2022/031083, filed Aug. 17, 2022, the entire contents of which are incorporated herein by reference.

TECHNICAL FIELD

The present disclosure relates to a control device, a control method, and a program.

BACKGROUND ART

To analyze the operation of a control device, a known technique samples the internal data of the control device and allows tracking of temporal changes in the data. For example, Patent Literature 1 describes a technique for periodically sampling the internal data of a control device and sequentially storing the sampled internal data into a storage memory, thus allowing a user to track the temporal changes in the data.

CITATION LIST

Patent Literature

Patent Literature 1: Unexamined Japanese Patent Application Publication No. 2015-176387

SUMMARY OF INVENTION

Technical Problem

With the technique described in Patent Literature 1, an input on which sampling data is based is not easily identified. This may cause inconvenience in tracking the temporal changes in the data for each input.

Under such circumstances, an objective of the present disclosure is to provide a control device and associated techniques that improve the trackability of temporal changes in internal data.

Solution to Problem

To achieve the above objective, a control device according to an aspect of the present disclosure includes an input interface to receive input information from an input device, an output interface to output output information to an output device, sampling means for generating a request identifier uniquely identifying the input information and sampling data in which the input information and the request identifier are associated with each other and storing the sampling data into storage means, and control means for processing the input information associated with the request identifier as a request, generating process state information about a process, and causing the output interface to output a result of the process as the output information. The sampling means further associates at least one of the process state information or the output information with the sampling data and stores the sampling data into the storage means.

Advantageous Effects of Invention

The control device and the associated techniques according to the above aspect of the present disclosure improve the trackability of temporal changes in internal data.

DESCRIPTION OF EMBODIMENTS

Figure 1:
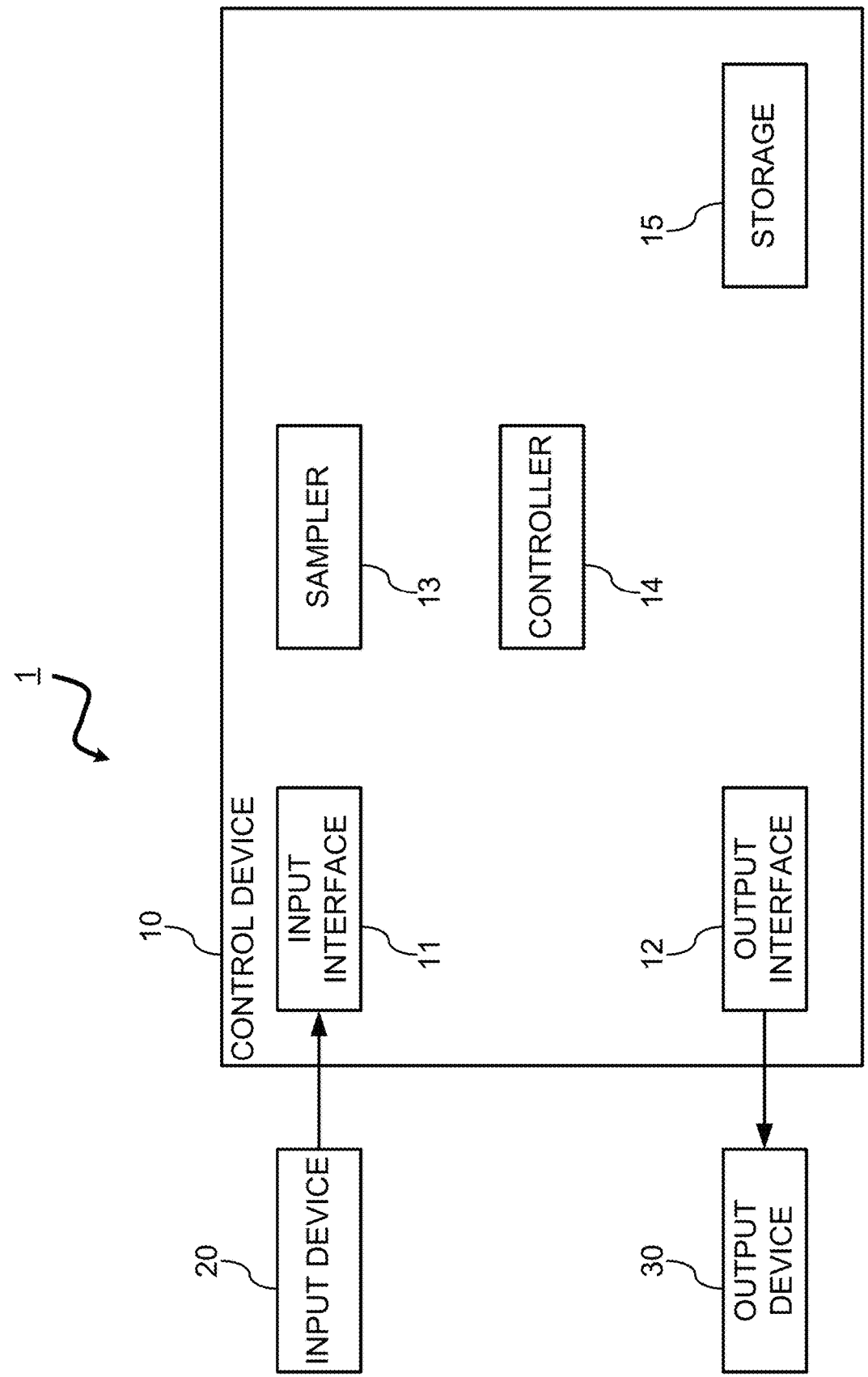
FIG. 1 is a diagram of a control system according to Embodiment 1 of the present disclosure, illustrating the overall structure.

A control system according to one or more embodiments of the present disclosure is described with reference to the drawings. Like reference signs denote like or corresponding components in the drawings.

Embodiment 1

A control system 1 according to Embodiment 1 is described with reference to FIG. 1. The control system 1 includes a control device 10, an input device 20, and an output device 30. In the control system 1, the control device 10 performs a process based on input information from the input device 20 and outputs a result of the process to the output device 30 as output information to control the output device 30. As described in detail later, in the control system 1, the control device 10 samples and stores the internal data of the control device 10, thus allowing a user to track temporal changes in the data. The control system 1 is used, for example, at a production site in a factory.

The input device 20 transmits input information to the control device 10. The input device 20 is, for example, a sensor installed at the production site. In this case, the input information includes a sensor value detected by the sensor. Although FIG. 1 illustrates one input device 20, multiple input devices 20 may be used. The input device 20 is an example of an input device in an aspect of the present disclosure.

The output device 30 receives output information from the control device 10 and operates based on the output information. The output device 30 is, for example, an actuator installed at the production site. Although FIG. 1 illustrates one output device 30, multiple output devices 30 may be used. The output device 30 is an example of an output device in an aspect of the present disclosure.

The control device 10 receives input information from the input device 20 and processes the input information as a request. The control device 10 outputs a result of the process to the output device 30 as output information. The control device 10 stores the internal data of the control device 10 such as the input information and the output information as sampling data. The control device 10 stores the sampling data, thus allowing the user to track the temporal changes in the data. Sampling is described in detail later. The control device 10 is, for example, a computer such as a programmable logic controller or an industrial personal computer (PC) installed at the production site. The control device 10 is an example of a control device in an aspect of the present disclosure.

The functional components of the control device 10 are described below. The control device 10 includes an input interface 11, an output interface 12, a sampler 13, a controller 14, and a storage 15.

The input interface 11 receives input information from the input device 20. The input interface 11 may receive input information regularly or irregularly. For example, the input interface 11 may receive input information at regular intervals of, for example, 10 milliseconds or 100 milliseconds, or may receive input information at intervals that vary based on the processing status of the controller 14 (described later). The input interface 11 is an example of an input interface in an aspect of the present disclosure.

The output interface 12 outputs, to the output device 30, a result of a process performed by the controller 14 (described later) as output information. The output interface 12 is an example of an output interface in an aspect of the present disclosure.

The storage 15 stores sampling data (described later). The storage 15 is an example of storage means in an aspect of the present disclosure.

When the input interface 11 receives input information, the sampler 13 generates a request identifier that uniquely identifies the received input information. A request identifier is generated every time the input interface 11 receives input information. When, for example, the input interface 11 receives the same items of input information at different times, different request identifiers are generated.

Figure 2:
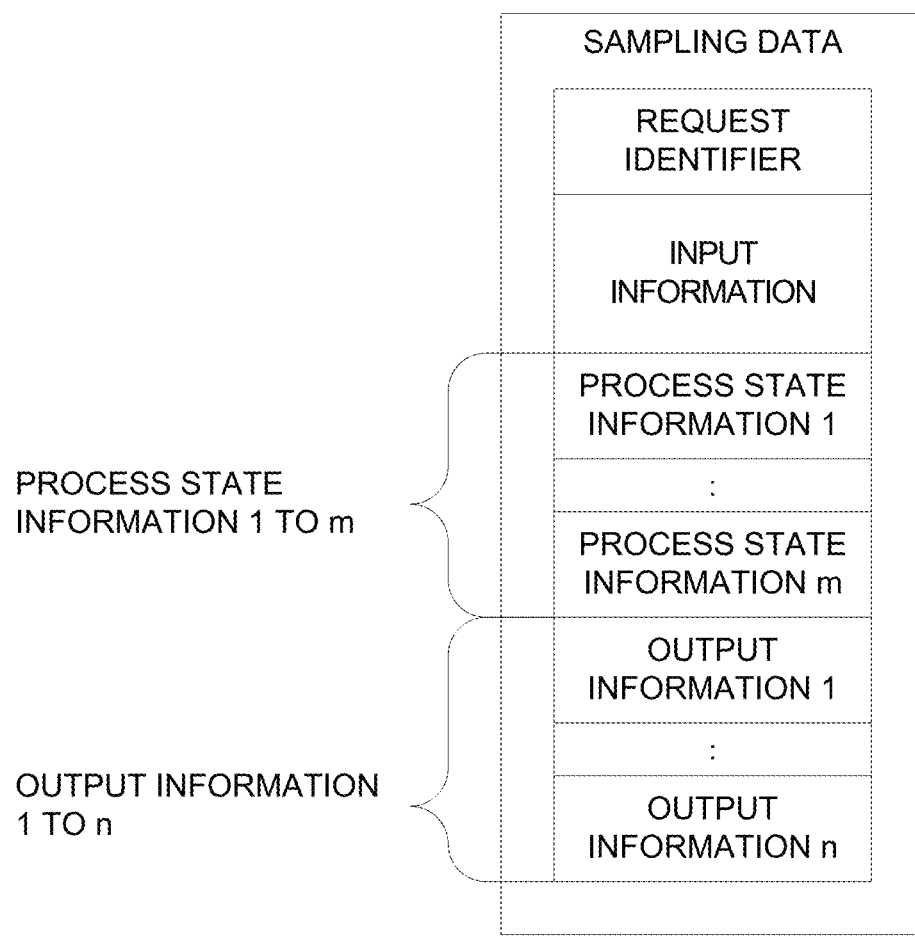
FIG. 2 is a diagram of example sampling data in the control system according to Embodiment 1 of the present disclosure.

The sampler 13 generates sampling data in which the generated request identifier and the input information received by the input interface 11 are associated with each other, and stores the sampling data into the storage 15. The sampling data is, for example, data illustrated in FIG. 2. The sampling data illustrated in FIG. 2 also includes, in addition to the request identifier and the input information, process state information and output information (described later). As described in detail later, the process state information and the output information are further associated with the stored sampling data. The resulting sampling data is illustrated in FIG. 2. The sampler 13 is an example of sampling means in an aspect of the present disclosure.

Although the sampler 13 has functions other than the functions described above, the other functions are associated with the controller 14 (described later) and are thus not described now.

The controller 14 receives the input information received by the input interface 11 together with the request identifier generated by the sampler 13, and thus processes the input information as a request. The request can be uniquely identified with the request identifier generated by the sampler 13. The controller 14 generates process state information about the process. The process state information includes, for example, the time at which the process is performed, data used for the process, and a result of the process. The generated process state information is used by the sampler 13. The controller 14 generates the result of the process as output information and controls the output interface 12 to output the output information to the output device 30. The controller 14 is an example of control means in an aspect of the present disclosure.

When all the processes for the request are complete, the controller 14 provides the sampler 13 with a notification of completion of processing together with the request identifier.

The other functions of the sampler 13 are now described. The sampler 13 further associates the process state information and the output information generated by the controller 14 with the sampling data stored in the storage 15 and stores the sampling data. For example, the controller 14 provides the sampler 13 with the generated process state information and output information together with the request identifier, and the sampler 13 associates, based on the provided request identifier, the provided process state information and output information with the sampling data and stores the sampling data. This updates the sampling data stored in the storage 15 as illustrated in, for example, FIG. 2. When the controller 14 performs the processing multiple times, the controller 14 also generates process state information and output information multiple times. The sampling data is updated every time the controller 14 generates process state information and output information.

The sampler 13 may further associate one of the process state information or the output information alone with the sampling data and may not associate the other with the sampling data. For example, when the process state information and the output information both include the result of the process and the time at which the process is performed, and when the user uses the result of the process and the time at which the process is performed, the sampler 13 may associate the process state information alone with the sampling data.

When receiving the notification of completion of processing and the request identifier provided by the controller 14, the sampler 13 determines whether the sampling data stored in the storage 15 and corresponding to the request identifier satisfies predetermined storage conditions. When the sampling data satisfies the storage conditions, the sampler 13 maintains the stored sampling data. When the sampling data does not satisfy the storage conditions, the sampler 13 deletes the stored sampling data. This prevents the storage 15 from unintendedly storing a large amount of sampling data. The storage conditions include, for example, the result of the process being out of a predetermined range or the time taken to perform the process being longer than or equal to a predetermined time length.

Figure 3:
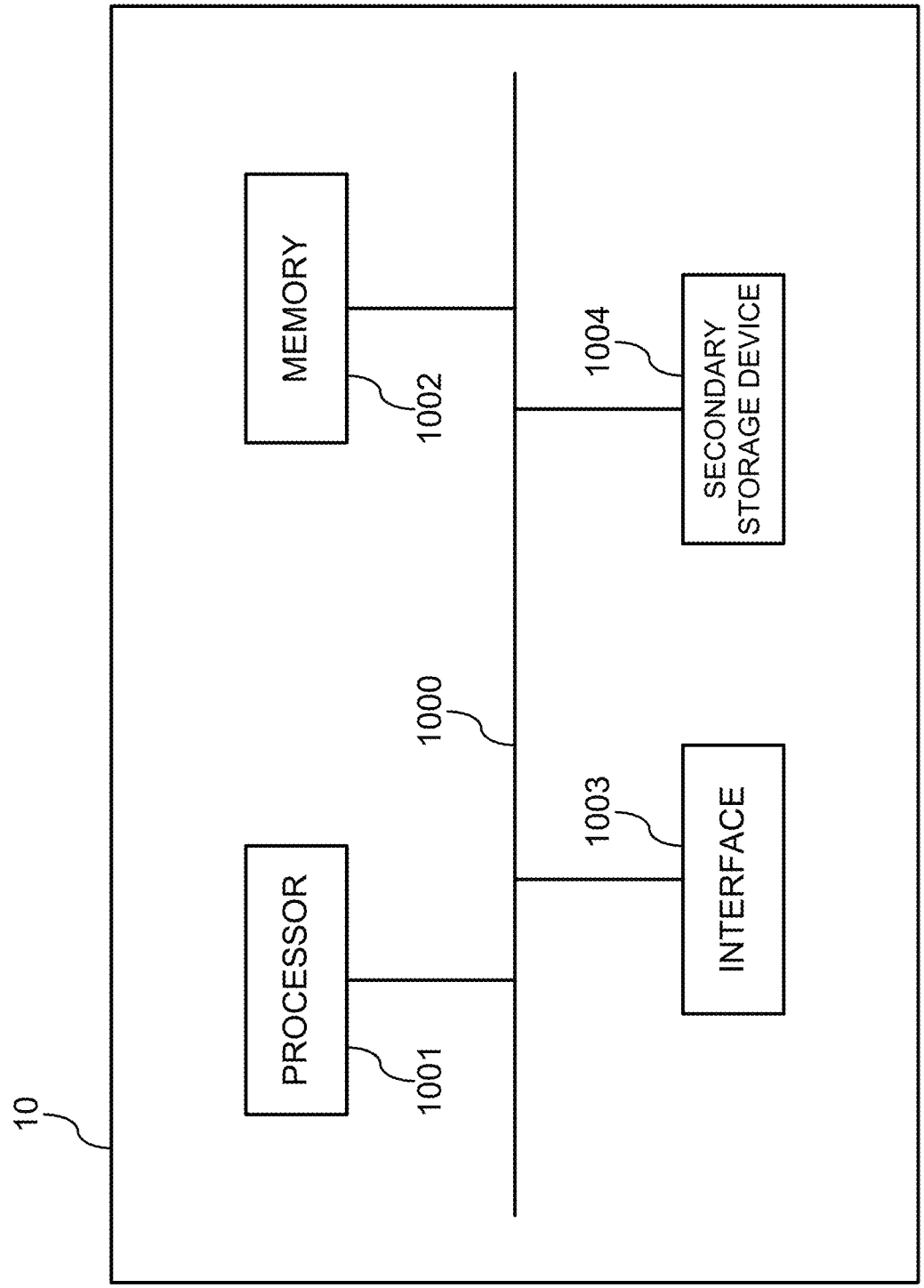
FIG. 3 is a diagram of a control device according to Embodiment 1 of the present disclosure, illustrating an example hardware configuration.

An example hardware configuration of the control device 10 is described with reference to FIG. 3. The control device 10 illustrated in FIG. 3 is implemented by, for example, a computer such as a programmable logic controller or an industrial PC.

The control device 10 includes a processor 1001, a memory 1002, an interface 1003, and a secondary storage device 1004 that are connected to one another with a bus 1000.

The processor 1001 is, for example, a central processing unit (CPU). Each function of the control device 10 is implemented by the processor 1001 that loads an operation program stored in the secondary storage device 1004 into the memory 1002 and executes the operation program.

The memory 1002 is a main memory device including, for example, a random-access memory (RAM). The memory 1002 stores the operation program loaded by the processor 1001 from the secondary storage device 1004. The memory 1002 serves as a working memory when the processor 1001 executes the operation program.

The interface 1003 is an input-output (I/O) interface, such as a serial port, a universal serial bus (USB) port, or a network interface. The interface 1003 implements the functions of the input interface 11 and the output interface 12.

The secondary storage device 1004 is, for example, a flash memory, a hard disk drive (HDD), or a solid-state drive (SSD). The secondary storage device 1004 stores an operation program to be executed by the processor 1001. The secondary storage device 1004 implements the functions of the storage 15.

An example sampling data generation operation performed by the control device 10 is described with reference to FIG. 4. The sampling data generation herein refers to generating sampling data with which a request identifier and input information alone are associated. The operation illustrated in FIG. 4 starts at, for example, the startup of the control device 10.

The input interface 11 in the control device 10 waits until reception timing for input information (step S101). When the reception timing for input information is reached, the input interface 11 receives input information from the input device 20 (step S102).

The sampler 13 in the control device 10 generates a request identifier that uniquely identifies the input information received in step S102 (step S103).

The sampler 13 generates sampling data in which the request identifier generated in step S103 and the input information received in step S102 are associated with each other and stores the sampling data into the storage 15 (step S104).

The control device 10 then repeats the operation in step S101 and subsequent steps. A request identifier is thus generated every time the input interface 11 receives input information, and new sampling data is stored.

An example request processing operation performed by the control device 10 is described with reference to FIG. 5. The operation illustrated in FIG. 5 starts at, for example, the startup of the control device 10.

The controller 14 in the control device 10 waits for the sampler 13 to generate the request identifier (step S201). This refers to waiting for the operation in step S103 illustrated in FIG. 4 to be performed. As illustrated in S102 in FIG. 4, the request identifier is generated after the input interface 11 receives the input information. The input information is associated with the request identifier by the sampler 13.

After the sampler 13 generates the request identifier, the controller 14 processes the input information associated with the request identifier by the sampler 13 as a request (step S202).

The controller 14 generates process state information about the request processing (step S203).

The sampler 13 associates the process state information generated by the controller 14 in step S203 with the sampling data corresponding to the request identifier and stores the sampling data (step S204).

The controller 14 generates a result of the process as output information and causes the output interface 12 to output the output information (step S205).

The sampler 13 associates the output information generated by the controller 14 in step S205 with the sampling data corresponding to the request identifier and stores the sampling data (step S206).

The controller 14 determines whether all the processes for the request are complete (step S207). When any process is incomplete (No in step S207), the control device 10 repeats the operation in step S203 and subsequent steps.

When all the processes are complete (Yes in step S207), the controller 14 provides the sampler 13 with a notification of completion of processing together with the request identifier (step S208). The control device 10 then repeats the operation in step S201 and subsequent steps.

Figure 6:
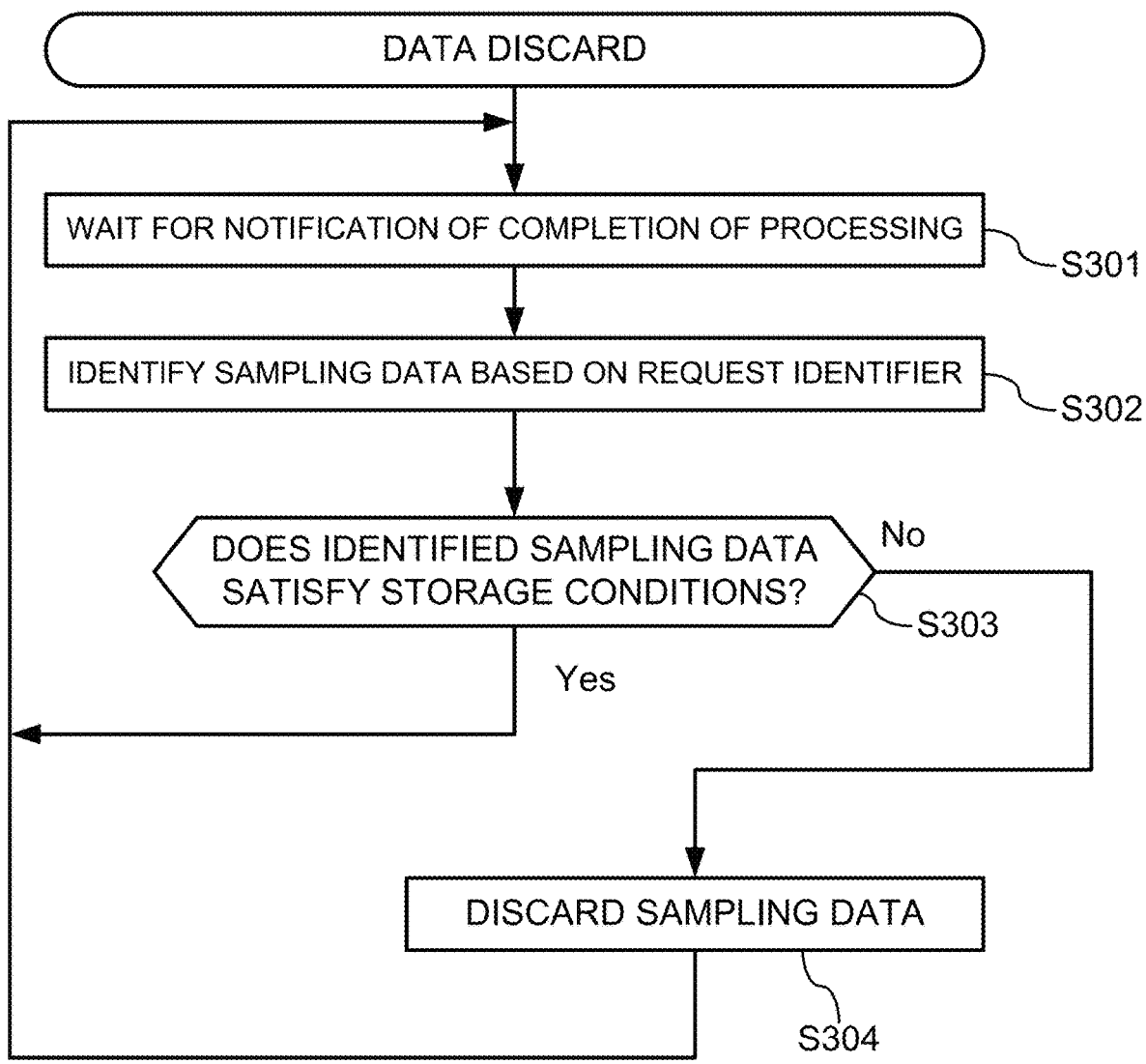
FIG. 6 is a flowchart of an example data discarding operation performed by the control device according to Embodiment 1 of the present disclosure.

An example data discarding operation performed by the control device 10 is described with reference to FIG. 6. The operation illustrated in FIG. 6 starts at, for example, the startup of the control device 10.

The sampler 13 in the control device 10 waits for the notification of completion of processing to be provided by the controller 14 (step S301). This refers to waiting for the operation in step S208 illustrated in FIG. 5 to be performed. The controller 14 provides the sampler 13 with the notification of completion of processing together with the request identifier.

When receiving the notification of completion of processing provided by the controller 14, the sampler 13 identifies, based on the request identifier provided together, the sampling data stored in the storage 15 and corresponding to the completion of the processing (step S302).

The sampler 13 determines whether the sampling data identified in step S302 satisfies predetermined storage conditions (step S303).

When the sampling data satisfies the storage conditions (Yes in step S303), the sampler 13 maintains the stored sampling data identified and repeats the operation in step S301 and subsequent steps.

When the sampling data does not satisfy the storage conditions (No in step S303), the sampler 13 deletes the identified sampling data from the storage 15 to discard the identified sampling data (step S304). The sampler 13 then repeats the operation in step 301 and subsequent steps.

The control system 1 according to Embodiment 1 described above can store items of sampling data based on request identifiers. Each request identifier uniquely identifies input information, thus facilitating tracking of the temporal changes in the internal data for each input. In the control system 1, before all the processes for a request are complete, process state information and output information are sequentially associated with sampling data for each process as illustrated in FIG. 2, and the sampling data is stored. This allows real-time tracking of time-series data. The control system 1 discards sampling data that does not satisfy the storage conditions when all the processes for a request are complete, thus preventing data volume from increasing unintendedly.

Embodiment 2

Figure 7:
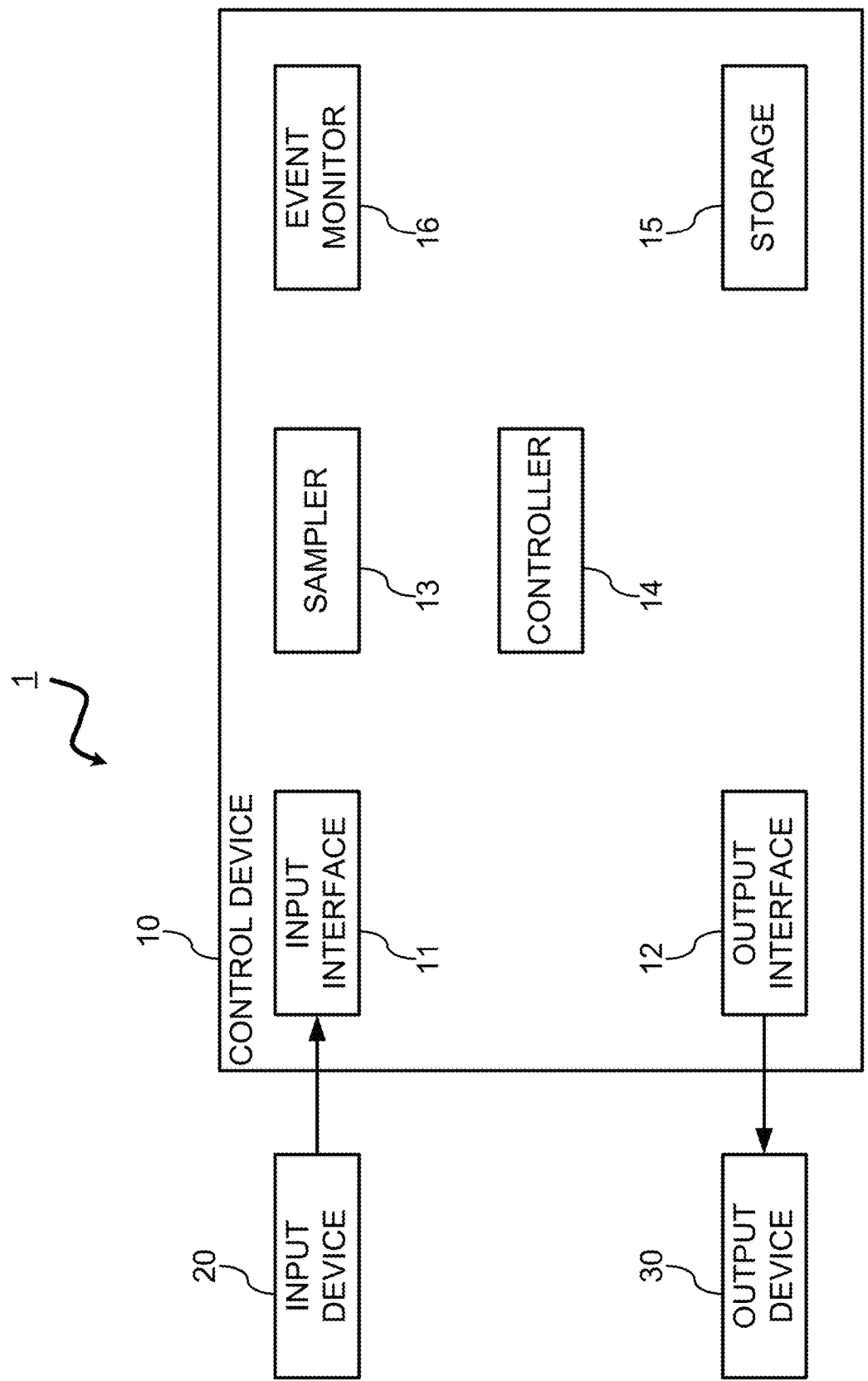
FIG. 7 is a diagram of a control system according to Embodiment 2 of the present disclosure, illustrating the overall structure.

A control system 1 according to Embodiment 2 is described with reference to FIG. 7. For simplicity, the components common to those of the control system 1 according to Embodiment 1 are not described.

The control system 1 according to Embodiment 2 differs from the control system 1 according to Embodiment 1 in the control device 10. The control device 10 according to Embodiment 2 further includes an event monitor 16, unlike in Embodiment 1. As described later, the functions of the sampler 13 are also slightly different.

Figure 8:
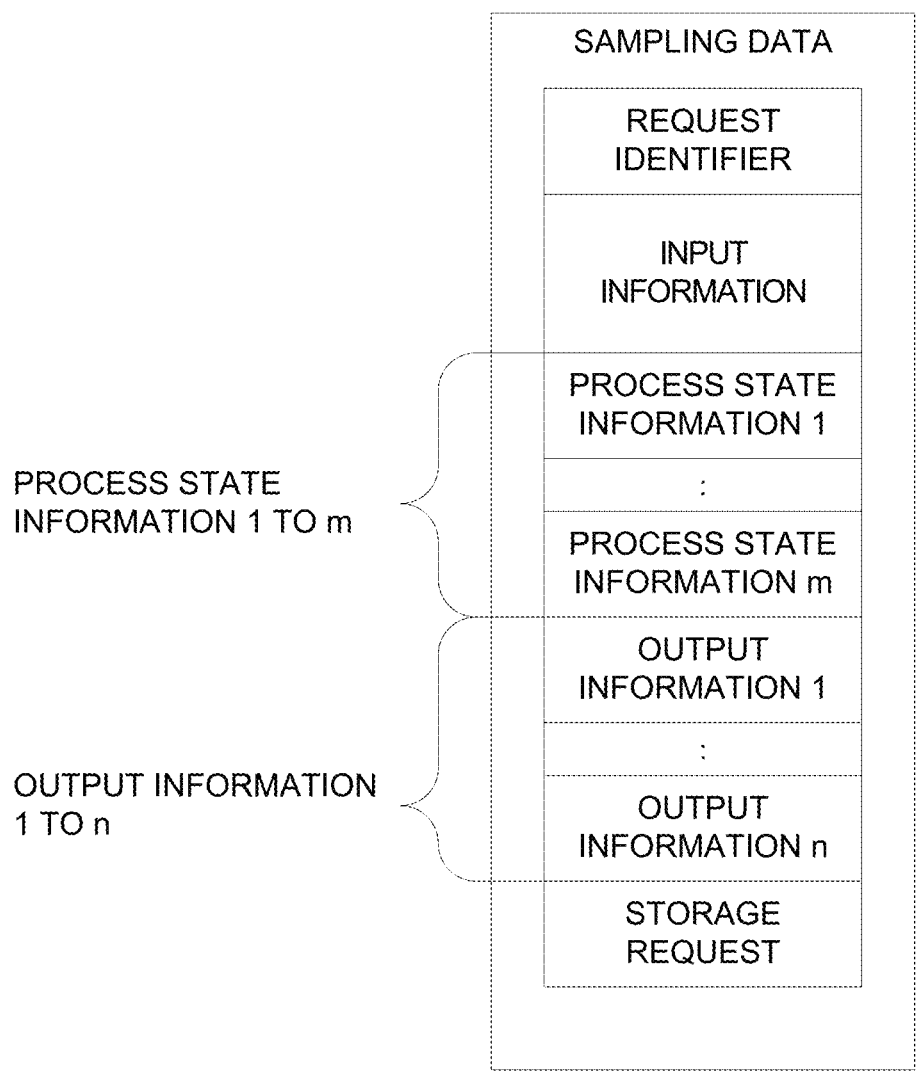
FIG. 8 is a diagram of example sampling data in the control system according to Embodiment 2 of the present disclosure.

As illustrated in FIG. 8, sampling data in Embodiment 2 further includes a storage request, unlike in Embodiment 1. As described in detail later, the storage request refers to data that requests not discarding the sampling data. The storage request is indicated by, for example, a flag.

The event monitor 16 monitors an occurrence of an event associated with the control device 10. For example, the event monitor 16 monitors an event that occurs in a process performed by the controller 14. In this case, for example, a specific result of a process, such as an abnormal value or an error, may be acquired in the process performed by the controller 14. This incident is an event.

The event monitor 16 may monitor an event notification provided from an external device. For example, input information received from the input device 20 that is an external device may satisfy specific conditions. This incident may be an event. For example, the input device 20 may include an alarm device, and input information may include an alarm from the alarm device. This incident may be an alarm event. The event monitor 16 is an example of event monitoring means in an aspect of the present disclosure.

The event monitor 16 stores, into the storage 15, event data in which an event that has occurred and a request identifier corresponding to the event are associated with each other. The request identifier corresponding to the event refers to a request identifier associated with the input information about the event. For example, for an event that has occurred in a process performed by the controller 14, a request identifier corresponding to the event is the request identifier corresponding to the input information on which the process is based. For example, when input information satisfying the specific conditions is an event, a request identifier corresponding to the event is the request identifier corresponding to the input information. Multiple request identifiers may correspond to an event. For example, for an event resulting from multiple pieces of input information, request identifiers corresponding to the event are the multiple request identifiers corresponding to the multiple pieces of input information.

The event monitor 16 provides the sampler 13 with a storage request indicating a request to store the sampling data corresponding to the request identifier included in the event data together with the request identifier.

When receiving the storage request provided by the event monitor 16, the sampler 13 further associates the storage request with the sampling data corresponding to the storage request and stores the sampling data into the storage 15.

When the sampler 13 receives the notification of completion of processing and the request identifier provided by the controller 14 and when the sampling data stored in the storage 15 and corresponding to the request identifier includes the storage request, the sampler 13 further maintains the stored sampling data. This prevents the sampling data relevant to the event from being discarded.

Figure 4:
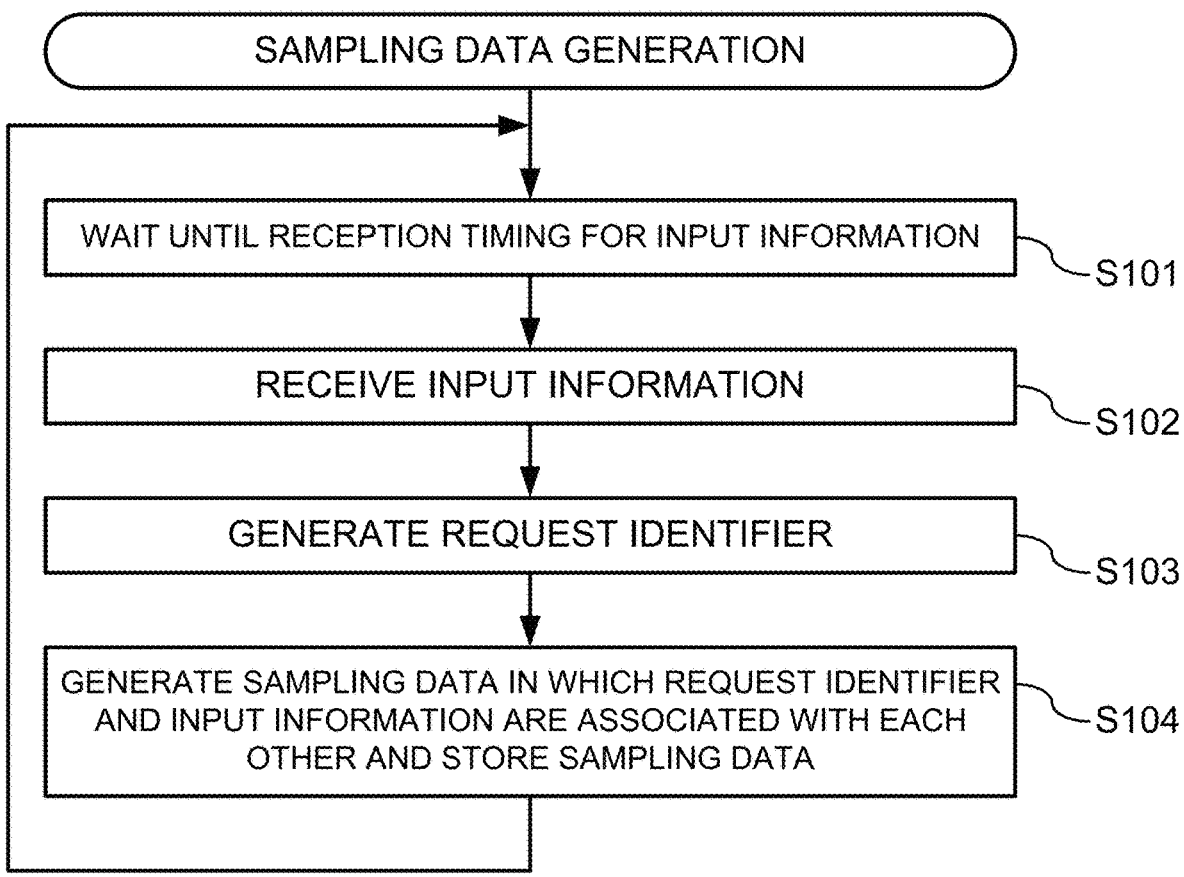
FIG. 4 is a flowchart of an example sampling data generation operation performed by the control device according to Embodiment 1 of the present disclosure.
Figure 5:
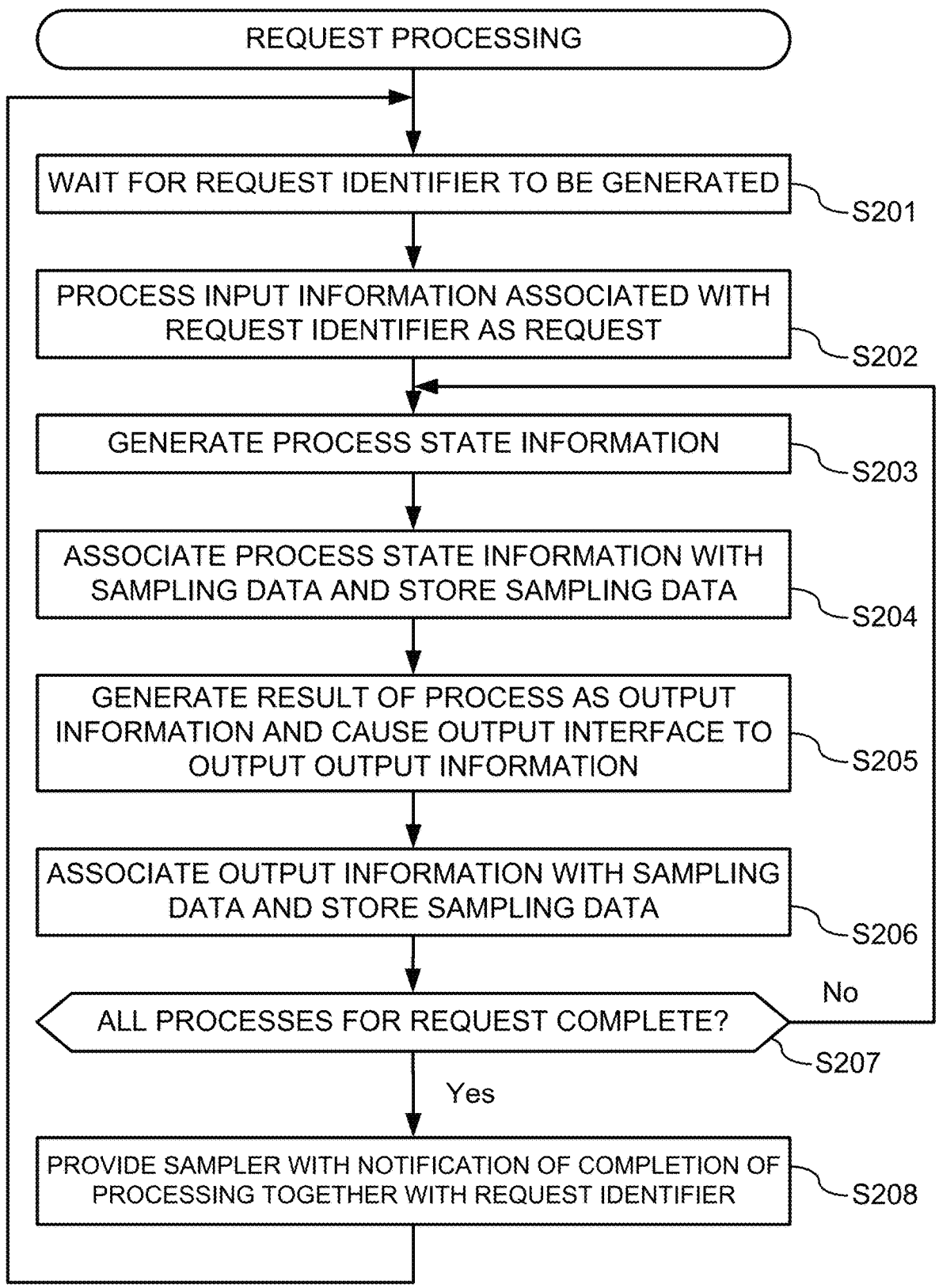
FIG. 5 is a flowchart of an example request processing operation performed by the control device according to Embodiment 1 of the present disclosure.

The sampling data generation operation and the request processing operation are the same as those in Embodiment 1 illustrated in FIGS. 4 and 5 and are not described.

An example event monitoring operation performed by the control device 10 according to Embodiment 2 is described with reference to FIG. 9.

The event monitor 16 in the control device 10 waits for an event to occur (step S401). The event monitor 16 waits in step S401 until an event to be monitored occurs.

When the event to be monitored occurs, the event monitor 16 stores, into the storage 15, event data in which the event and the request identifier are associated with each other (step S402).

The event monitor 16 provides the sampler 13 with a storage request for the sampling data corresponding to the request identifier (step S403).

When receiving the storage request provided by the event monitor 16 in step S403, the sampler 13 associates the storage request with the sampling data corresponding to the request identifier and stores the sampling data into the storage 15 (step S404). The control device 10 then repeats the operation in step S401 and subsequent steps. Through the operations described above, event data can be stored into the storage 15, and a storage request can be associated with the sampling data relevant to the event.

Figure 10:
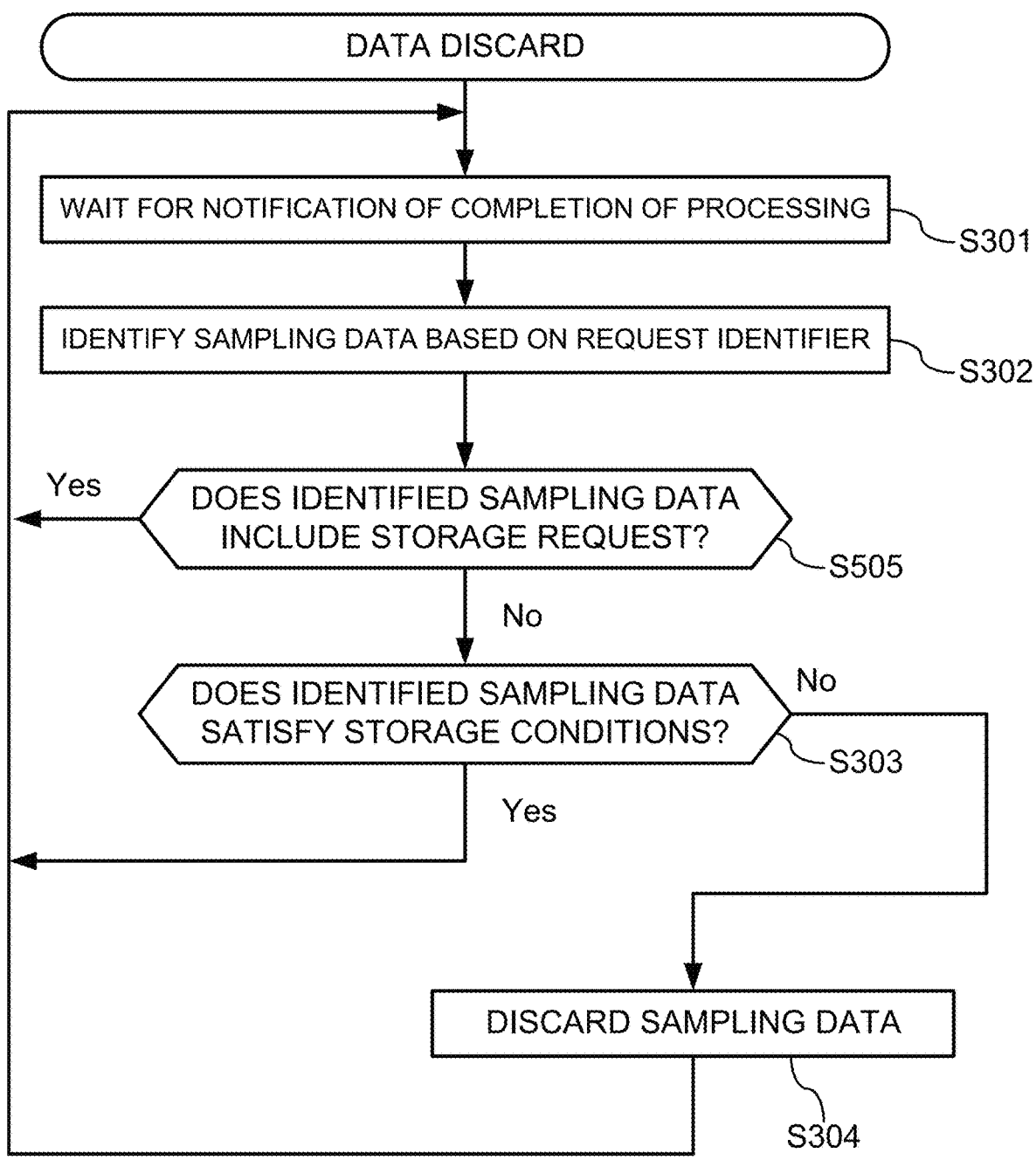
FIG. 10 is a flowchart of an example data discarding operation performed by the control device according to Embodiment 2 of the present disclosure.

With reference to FIG. 10, the data discarding operation performed by the control device 10 is described focusing on the differences from the data discarding operation in Embodiment 1. As illustrated in FIG. 10, the data discarding operation in Embodiment 2 is the same as the data discarding operation in Embodiment 1 illustrated in FIG. 6, except that step S505 is between step S302 and step S303. Thus, the operation included in step S505 is simply described below.

The sampler 13 determines whether the identified sampling data includes a storage request (step S505).

When the identified sampling data includes a storage request (Yes in step S505), the stored sampling data is maintained. The sampler 13 thus repeats the operation in step S301 and subsequent steps. When the identified sampling data does not include a storage request (No in step S505), the sampler 13 performs the operation in step S303 and subsequent steps. This operation is the same as the operation in Embodiment 1.

The control system 1 according to Embodiment 2 described above stores, when an event occurs, event data in which the event and the request identifier are associated with each other. This allows efficient tracking of the sampling data relevant to the event based on the request identifier. In the control system 1 according to Embodiment 2, a storage request is associated with sampling data relevant to an event, thus preventing the sampling data relevant to the event from being discarded.

Embodiment 3

Figure 11:
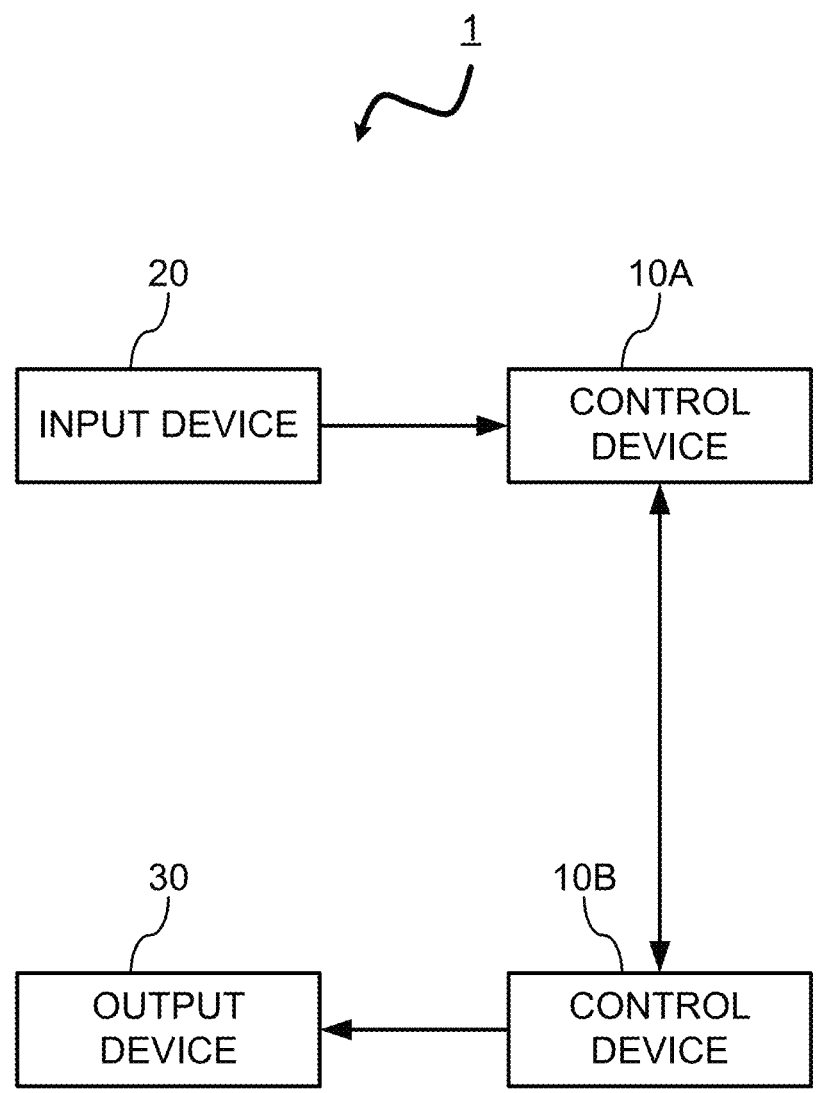
FIG. 11 is a diagram of a control system according to Embodiment 3 of the present disclosure, illustrating the overall structure.

A control system 1 according to Embodiment 3 is described with reference to FIG. 11. The control system 1 according to Embodiment 3 allows tracking of temporal changes in data across multiple control devices 10. The control system 1 according to Embodiment 3 includes multiple control devices 10, unlike in Embodiment 2. Although FIG. 11 illustrates two control devices 10, three or more control devices 10 may be used. In FIG. 11, the control devices 10 are referred to as a control device 10A and a control device 10B to be distinguished from each other. When the control devices 10 are to be distinguished from each other, the control devices 10 are referred to as the control device 10A and the control device 10B.

In Embodiment 3, the functional components of the control devices 10 are substantially the same as those in Embodiment 2 illustrated in FIG. 7, but are partly different as described later. The control device 10A includes the output interface connected to the input interface in the control device 10B. The control device 10B includes the output interface connected to the input interface in the control device 10A. The control device 10A and the control device 10B can thus communicate with each other.

Figure 12:
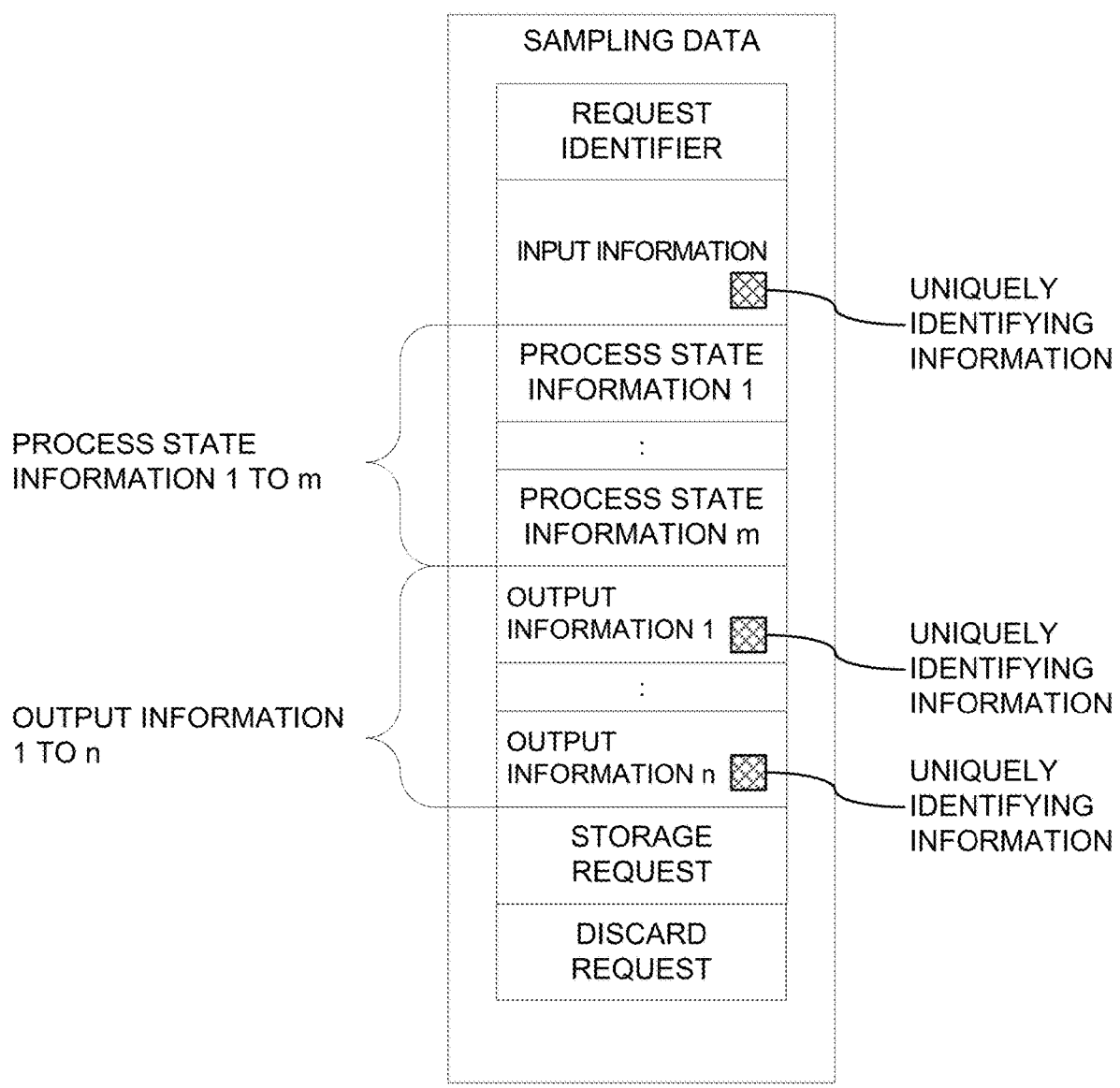
FIG. 12 is a diagram of example sampling data in the control system according to Embodiment 3 of the present disclosure.

An example sampling data in Embodiment 3 is described with reference to FIG. 12. Sampling data in Embodiment 3 further includes a discard request (described later) and also includes input information and output information each including uniquely identifying information, unlike in Embodiment 2 illustrated in FIG. 8. The uniquely identifying information allows input and output between the control devices 10 to be uniquely identified from outside the control devices 10. For example, information combining the internet protocol (IP) address, the port number, and the sequence number of a control device 10 may be uniquely identifying information.

The input interface 11 in one of the control devices 10 according to Embodiment 3 receives output information output by the other control device 10 as input information, and also receives a storage request and uniquely identifying information (described later) transmitted by the event monitor 16 in the other control device 10, unlike in Embodiment 2. As described later, the output information output by the other control device 10 includes uniquely identifying information. Thus, when the input interface 11 receives the output information as input information, the input information includes the same uniquely identifying information.

The controllers 14 in Embodiment 3 generate output information including uniquely identifying information when generating the output information, unlike in Embodiment 2.

When detecting an occurrence of an event, the event monitor 16 in one of the control devices 10 according to Embodiment 3 transmits, to the other control device 10, a storage request together with the uniquely identifying information included in the input information about the event, unlike in Embodiment 2. The event monitor 16 can thus request the other control device 10 to which the information about the event is transmitted to store the sampling data relevant to the event. The event monitor 16 in one of the control devices 10 according to Embodiment 3 controls the output interface 12 to transmit the storage request and the uniquely identifying information to the other control device 10.

The samplers 13 in Embodiment 3 associate a discard request (described later) with sampling data and also delete stored sampling data based on a discard request, unlike in Embodiment 2. When each sampler 13 in Embodiment 3 receives the notification of completion of processing provided by the controller 14, and when the sampling data corresponding to the completion of processing does not include a storage request, the sampler 13 generates a discard request to discard the sampling data corresponding to the completion of processing at a future time, and associates the discard request with the sampling data. The discard request includes, for example, information indicating the time at which the sampling data is to be discarded. The time may be set to leave enough time to store the sampling data based on the storage request.

One of the control devices 10 that currently includes sampling data including no storage request may receive a storage request for the sampling data when an event occurs in the other control device 10. Thus, when sampling data corresponding to the completion of processing includes no storage request, each sampler 13 in Embodiment 3 generates a discard request without immediately discarding the sampling data.

The sampler 13 in one of the control devices 10 according to Embodiment 3 identifies, when receiving a storage request and uniquely identifying information transmitted by the event monitor 16 in the other control device 10, sampling data based on the uniquely identifying information and associates the storage request with the identified sampling data. This associates the storage request with the sampling data relevant to the event that has occurred in the other control device 10. Thus, the sampling data relevant to the event that has occurred in the other control device 10 can be stored without being discarded. When the identified sampling data includes a discard request, the sampler 13 deletes the discard request. When the discard request remains in the sampling data, the sampling data is to be discarded based on the discard request.

With reference to the drawings, example operations performed by the control devices 10 according to Embodiment 3 are described focusing on the differences from the operations performed by the control device 10 according to Embodiment 1 or 2.

The sampling generation operation is the same as the sampling data generation operation in Embodiment 1 or 2 illustrated in FIG. 4. As described above, output information output by the other control device 10 may be received as input information. In this case, the input information includes uniquely identifying information about the other control device 10.

The request processing operation is substantially the same as the request processing operation in Embodiment 1 or 2 illustrated in FIG. 5. In generating output information in step S205, each controller 14 generates output information including uniquely identifying information, unlike in Embodiment 1 or 2.

An example discard request generation operation performed by the control devices 10 according to Embodiment 3 is described with reference to FIG. 13. The operation is substantially the same as the data discarding operation in Embodiment 2 illustrated in FIG. 10, and is thus described simply focusing on the differences from the data discarding operation in Embodiment 2.

Figure 13:
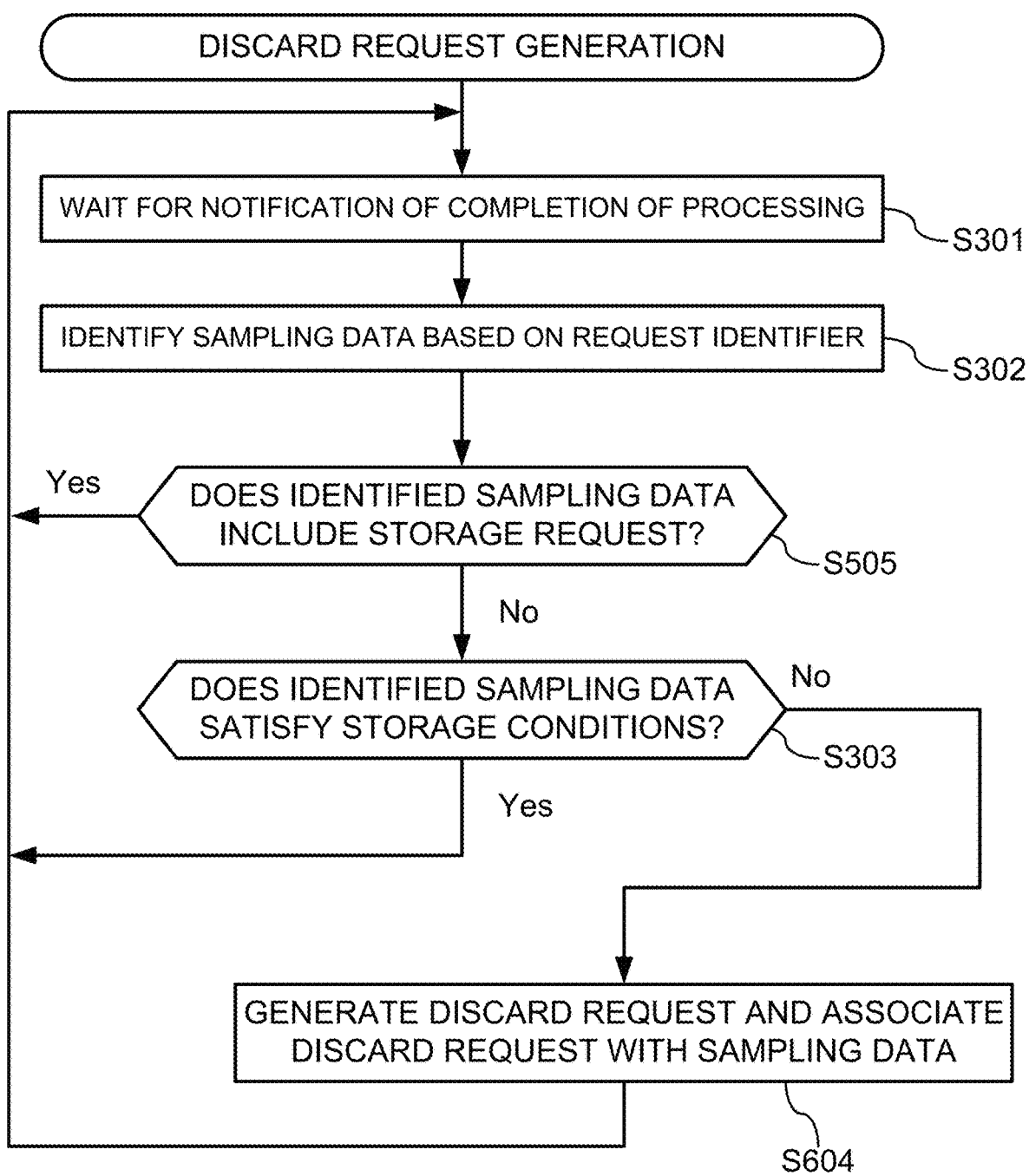
FIG. 13 is a flowchart of an example discard request generation operation performed by control devices according to Embodiment 3 of the present disclosure.

The operation in FIG. 10 and the operation in FIG. 13 are the same except that the operation in step S304 in FIG. 10 is changed to the operation in step S604 in FIG. 13. Thus, the operation in step S604 is described.

When the sampling data does not satisfy the storage conditions (No in step S303), the sampler 13 generates a discard request and associates the generated discard request with the identified sampling data (step S604). The sampling data is thus deleted at, for example, the time indicated by the discard request. The sampler 13 then repeats the operation in step 301 and subsequent steps.

Figure 9:
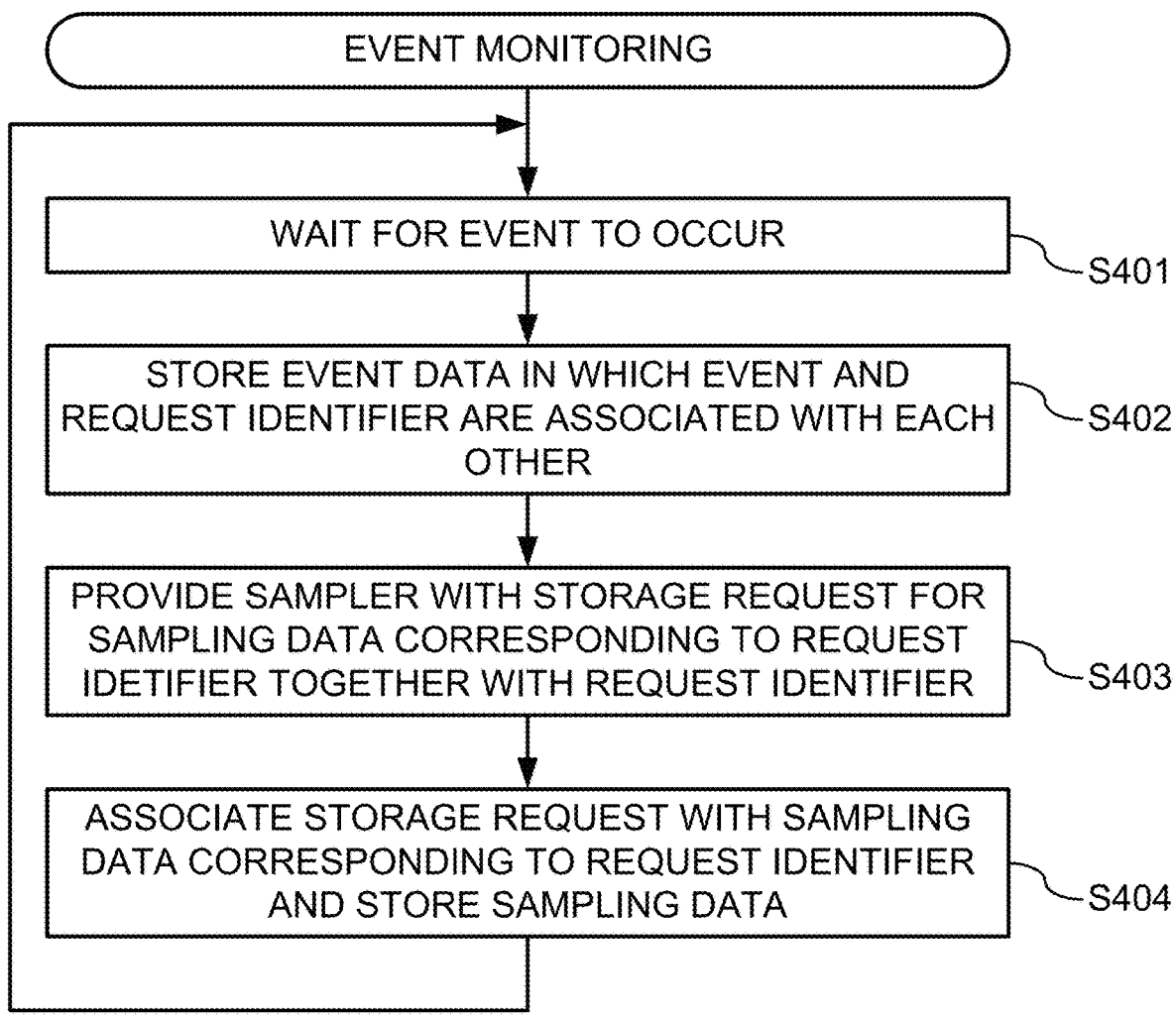
FIG. 9 is a flowchart of an example event monitoring operation performed by a control device according to Embodiment 2 of the present disclosure.
Figure 14:
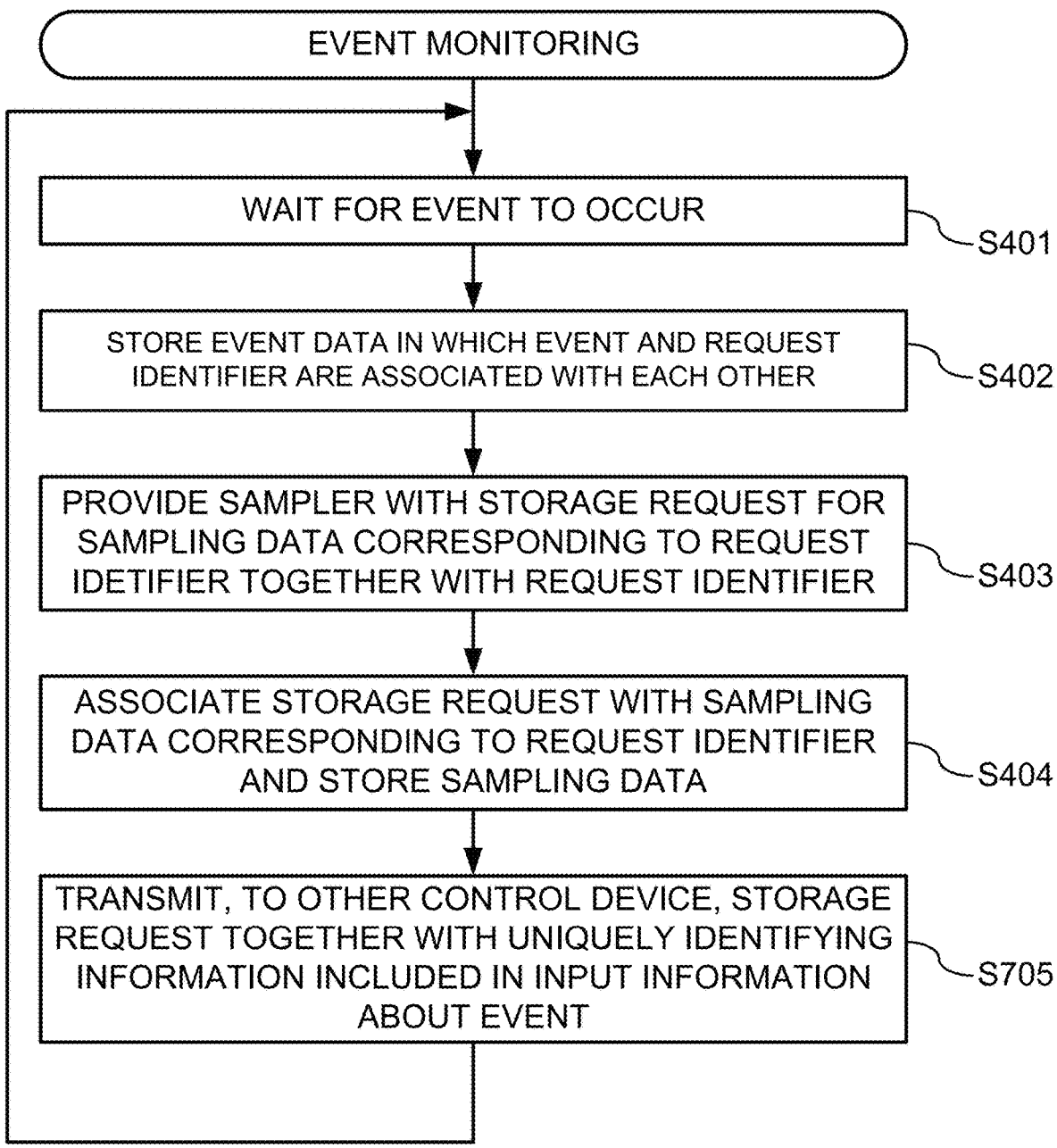
FIG. 14 is a flowchart of an example event monitoring operation performed by the control devices according to Embodiment 3 of the present disclosure.

With reference to FIG. 14, the event monitoring operation is described focusing on the differences from the event monitoring operation in Embodiment 2 illustrated in FIG. 9.

The operation in FIG. 9 and the operation in FIG. 14 are the same except that the operation in step S705 is performed after the operation in step S404. Thus, the operation in step S705 is described.

After the operation in step S404, the event monitor 16 in one of the control devices 10 controls the output interface 12 to transmit, to the other control device 10, the storage request generated in step S404 together with the uniquely identifying information included in the input information about the event (step S705). As described later, the other control device 10 that has received the storage request and the uniquely identifying information associates the storage request with the sampling data identified based on the uniquely identifying information. The control device 10 then repeats the operation in step S401 and subsequent steps.

Figure 15:
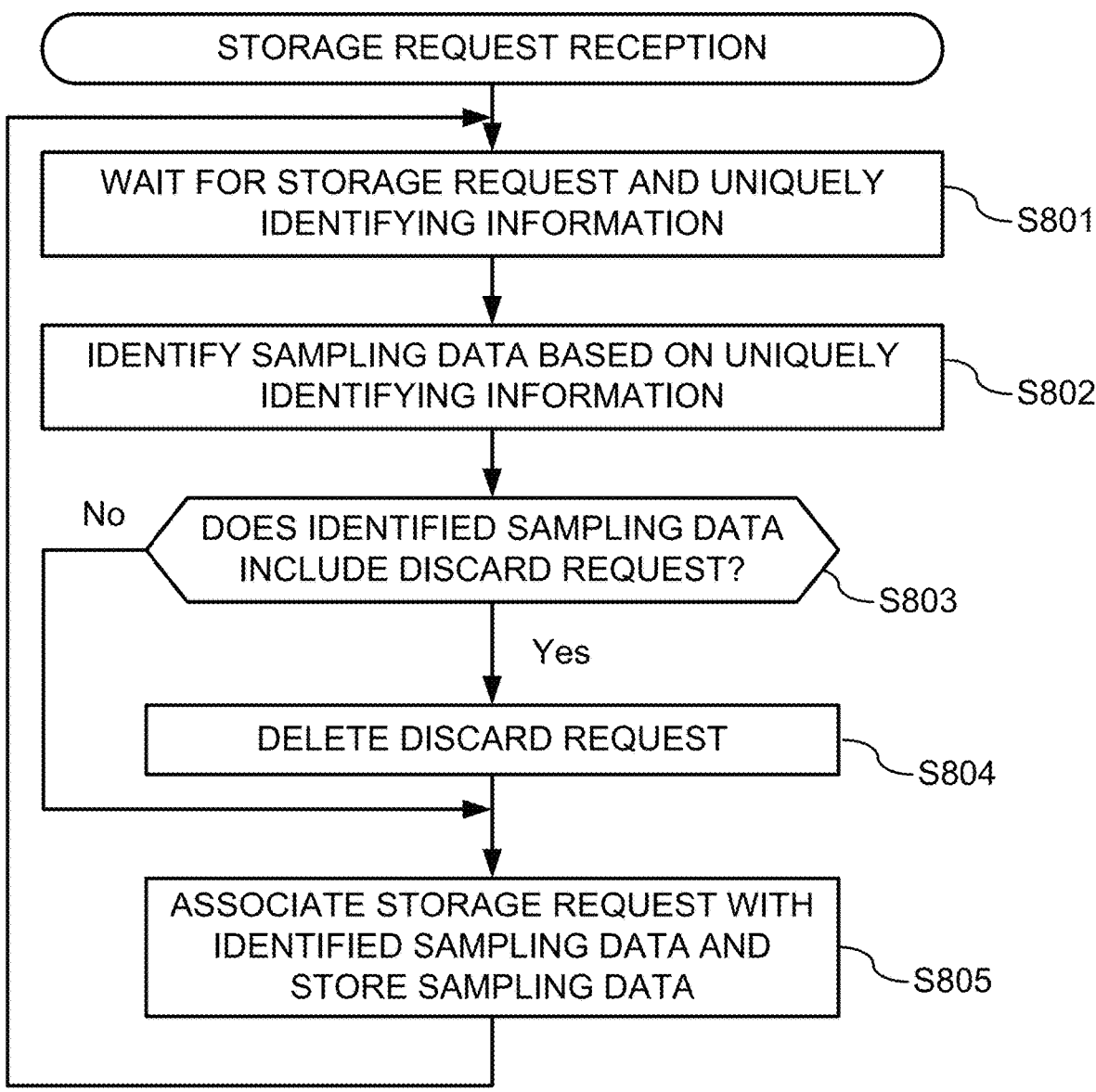
FIG. 15 is a flowchart of an example storage request reception operation performed by the control devices according to Embodiment 3 of the present disclosure.

An example storage request reception operation performed by the control devices 10 according to Embodiment 3 is described with reference to FIG. 15. The storage request reception operation is performed when one of the control devices 10 receives a storage request and uniquely identifying information from the event monitor 16 in the other control device 10.

The sampler 13 in one of the control devices 10 waits for a storage request and uniquely identifying information transmitted by the event monitor 16 in the other control device 10 (step S801).

When receiving the storage request and the uniquely identifying information in step S801, the sampler 13 identifies the sampling data corresponding to the uniquely identifying information based on the uniquely identifying information (step S802).

The sampler 13 determines whether the sampling data identified in step S802 includes a discard request (step S803). When the identified sampling data does not include a discard request, the sampler 13 performs the operation in step S805 and subsequent steps.

When the identified sampling data includes a discard request, the sampler 13 deletes the discard request from the sampling data (step S804).

The sampler 13 associates the storage request with the identified sampling data and stores the sampling data (step S805). The sampler 13 then repeats the operation in step S801 and subsequent steps.

The control system 1 according to Embodiment 3 described above facilitates tracking of temporal changes in data across the multiple control devices 10. The control system 1 uses the uniquely identifying information that allows information about input and output between the control devices 10 to be uniquely identified from outside, and can thus store the sampling data relevant to an event that has occurred in one of the control devices 10 without discarding the sampling data.

Modifications

In the hardware configuration illustrated in FIG. 3, the control device 10 includes the secondary storage device 1004. However, the secondary storage device 1004 may be external to the control device 10, and the control device 10 and the secondary storage device 1004 may be connected to each other with the interface 1003. In this configuration, the secondary storage device 1004 may be a removable medium such as a USB flash drive or a memory card.

In place of the hardware configuration illustrated in FIG. 3, the control device 10 may include a dedicated circuit including an application-specific integrated circuit (ASIC) or a field-programmable gate array (FPGA). In the hardware configuration illustrated in FIG. 3, some functions of the control device 10 may be implemented by, for example, a dedicated circuit connected to the interface 1003.

The programs used in the control device 10 may be distributed on a non-transitory computer-readable recording medium such as a compact disc read-only memory (CD-ROM), a digital versatile disc (DVD), a USB flash drive, a memory card, or an HDD. A specific computer or a general-purpose computer on which the programs are installed can function as the control device 10.

The programs may be stored in a storage device in another server on the Internet and may be downloaded from the server.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Control system
10, 10A, 10B Control device
11 Input interface
12 Output interface
13 Sampler
14 Controller
15 Storage
16 Event monitor
20 Input device
30 Output device
1000 Bus
1001 Processor
1002 Memory
1003 Interface
1004 Secondary storage device

The invention claimed is:

1. A control device, comprising:
an input interface to receive input information from an input device;
an output interface to output output information to an output device;
processing circuitry configured to:
generate a request identifier uniquely identifying the input information and sampling data in which the input information and the request identifier are associated with each other and store the sampling data into a storage;
process the input information associated with the request identifier as a request, generate process state information about a process, and cause the output interface to output a result of the process as the output information,
associate at least one of the process state information or the output information with the sampling data and store the sampling data into the storage; and
monitor an occurrence of an event and store, into the storage, event data in which the event and the request identifier are associated with each other,
provide a storage request indicating a request to store sampling data corresponding to the request identifier included in the event data, and upon completion of the process, maintain the sampling data in the storage when the sampling data corresponds to the storage request, maintain the sampling data in the storage when the sampling data does not correspond to the storage request and when the sampling data satisfies a predetermined storage condition.

2. The control device according to claim 1, wherein
upon completion of the process, the processing circuitry maintains the sampling data in the storage when the sampling data satisfies a predetermined storage condition, and deletes the sampling data from the storage when the sampling data does not satisfy the predetermined storage condition.

3. The control device according to claim 1, wherein
the processing circuitry monitors an event occurring in the process performed by the processing circuitry.

4. The control device according to claim 1, wherein
the processing circuitry monitors an event notification provided from an external device.

5. The control device according to claim 1, wherein
the input interface further receives output information output by another control device as the input information,
the output information output by the other control device includes uniquely identifying information allowing input and output between the control device and the other control device to be uniquely identified from outside, and
the processing circuitry further transmits, to the other control device, a storage request indicating a request to store sampling data corresponding to the uniquely identifying information included in input information about the event together with the uniquely identifying information.

6. The control device according to claim 1, wherein
the processing circuitry further outputs the output information including uniquely identifying information allowing input and output between the control device and another control device to be uniquely identified from outside,
the input interface further receives a storage request and uniquely identifying information transmitted by the other control device,
upon completion of the process performed by the processing circuitry, the processing circuitry further maintains the sampling data in the storage when the sampling data corresponds to the storage request, maintains the sampling data in the storage when the sampling data does not correspond to the storage request and when the sampling data satisfies a predetermined storage condition, and associates, with the sampling data, a discard request indicating a request to discard the sampling data at a future time when the sampling data does not correspond to the storage request and when the sampling data does not satisfy the predetermined storage condition,
when the input interface receives a storage request and uniquely identifying information transmitted by the other control device, the processing circuitry further identifies sampling data stored in the storage and corresponding to the received uniquely identifying information, and associates the identified sampling data and the received storage request with each other,
when the identified sampling data includes the discard request, the processing circuitry further deletes the discard request from the sampling data, and the processing circuitry further deletes the sampling data including the discard request based on the discard request.

7. The control device according to claim 1, wherein
upon completion of the process performed by the processing circuitry, the processing circuitry further maintains the sampling data in the storage when the sampling data satisfies a predetermined storage condition.

8. The control device according to claim 1, wherein
the input interface further receives output information output by another control device as the input information.

9. The control device according to claim 1, wherein
the input interface further receives output information output by another control device as the input information, and
the output information output by the other control device includes uniquely identifying information allowing input and output between the control device and the other control device to be uniquely identified from outside.

10. The control device according to claim 1, wherein
the processing circuitry further outputs the output information including uniquely identifying information allowing input and output between the control device and another control device to be uniquely identified from outside.

11. The control device according to claim 1, wherein
the processing circuitry further outputs the output information including uniquely identifying information allowing input and output between the control device and another control device to be uniquely identified from outside, and
the input interface further receives a storage request and uniquely identifying information transmitted by the other control device.

12. The control device according to claim 1, wherein
the processing circuitry further outputs the output information including uniquely identifying information allowing input and output between the control device and another control device to be uniquely identified from outside,
the input interface further receives a storage request and uniquely identifying information transmitted by the other control device, and
upon completion of the process performed by the processing circuitry, the processing circuitry further maintains the sampling data in the storage when the sampling data corresponds to the storage request, maintains the sampling data in the storage when the sampling data does not correspond to the storage request and when the sampling data satisfies a predetermined storage condition, and associates, with the sampling data, a discard request indicating a request to discard the sampling data at a future time when the sampling data does not correspond to the storage request and when the sampling data does not satisfy the predetermined storage condition.

13. A control method, comprising:
receiving input information from an input device;
generating a request identifier uniquely identifying the input information, generating sampling data in which the input information and the request identifier are associated with each other, and storing the sampling data into a storage;
processing the input information associated with the request identifier as a request, generating process state information about a process, and outputting a result of the process as output information to an output device;

associating at least one of the process state information or the output information with the sampling data and storing the sampling data into the storage; and monitoring an occurrence of an event and storing, into the storage, event data in which the event and the request identifier are associated with each other, providing a storage request indicating a request to store sampling data corresponding to the request identifier included in the event data, and upon completion of the processing, maintaining the sampling data in the storage when the sampling data corresponds to the storage request, maintaining the sampling data in the storage when the sampling data does not correspond to the storage request and when the sampling data satisfies a predetermined storage condition.

14. A non-transitory computer-readable storage medium storing instructions, which when executed by circuitry, cause the circuitry to perform a method comprising:

generating a request identifier uniquely identifying input information and sampling data in which the input information and the request identifier are associated with each other and storing the sampling data into a storage medium;

processing the input information associated with the request identifier as a request, generating process state information about a process, and outputting a result of the process as the output information;

associating at least one of the process state information or the output information with the sampling data and storing the sampling data into the storage medium;

monitoring an occurrence of an event and storing, into the storage medium, event data in which the event and the request identifier are associated with each other;

providing a storage request indicating a request to store sampling data corresponding to the request identifier included in the event data; and upon completion of the processing maintaining the sampling data in the storage medium when the sampling data corresponds to the storage request, maintaining the sampling data in the storage medium when the sampling data does not correspond to the storage request and when the sampling data satisfies a predetermined storage condition.

* * * * *